US006669849B1

(12) United States Patent
Nguyen et al.

(10) Patent No.: US 6,669,849 B1
(45) Date of Patent: *Dec. 30, 2003

(54) WATER TREATMENT PROCESS (75) Inventors: Hung Van Nguyen, Glen Iris (AU); Donald Bruce Bursill, Tea Tree Gully (AU); James Young Morran, Taperoo (AU); Mary Drikas, Pasadena (AU); Veronica Laurel Pearce, Taringa (AU)

(73) Assignee: Orica Australia Pty Ltd, Melbourne (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,044

(22) PCT Filed: Sep. 8, 1995

(86) PCT No.: PCT/AU95/00583

§ 371 (c)(1),
(2), (4) Date: May 30, 1997

(87) PCT Pub. No.: WO96/07615

PCT Pub. Date: Mar. 14, 1996

(30) Foreign Application Priority Data

Sep. 9, 1994  (AU) ............................ PM8071
Nov. 22, 1994 (AU) ............................ PM9599

(51) Int. Cl.[7] ............................ B01D 15/04; C02F 1/28; C02F 9/00
(52) U.S. Cl. ............ 210/638; 210/661; 210/665; 210/668; 210/676; 210/679; 210/692; 210/694; 210/695
(58) Field of Search ................ 210/638, 661, 210/665, 668, 675, 679, 692, 695, 521, 189, 676, 694

(56) References Cited

U.S. PATENT DOCUMENTS 1,190,863 A * 7/1916 Corne et al. ............ 210/521
2,642,514 A   6/1953 Herkenhoff ............ 210/675

(List continued on next page.)

FOREIGN PATENT DOCUMENTS

| AU | 202217 | 6/1955 |
| AU | 20648/67 | 10/1969 |
| AU | 32207/78 | 7/1979 |
| AU | 52709/79 | 6/1980 |
| AU | 43000/93 | 1/1994 |
| EP | 522 856 A1 | 1/1993 |
| GB | 1 559 809 | 1/1980 |
| WO | WO 93/21114 | 10/1993 |

OTHER PUBLICATIONS

Bolto et al., "Continuous Ion Exchange Using Magnetic Micro–Resins—The Continuous Sirotherm Desalination Demonstration Plant" *AWWA 1985 Int. Conf. Proceedings* (1985) 282–288.

(List continued on next page.)

*Primary Examiner*—Ivars Cintins
(74) *Attorney, Agent, or Firm*—Pillsbury Winthrop LLP (57) ABSTRACT

The present invention relates to water treatment, in particular to a process for the removal of dissolved organic carbon from water. The process includes the following steps, adding an ion-exchange resin to water containing a contaminant such as dissolved organic carbon, dispersing the resin in the contaminated water to enable adsorption of the dissolved organic carbon onto the resin, and separating the resin loaded with contaminant from the water. In a preferred embodiment the process employs a magnetic ion-exchange resin.

18 Claims, 1 Drawing Sheet

U.S. PATENT DOCUMENTS

| | | | | |
|---|---|---|---|---|
| 2,697,724 A | * | 12/1954 | Collier | 210/189 |
| 3,560,378 A | * | 2/1971 | Weiss et al. | 210/679 |
| 4,154,675 A | | 5/1979 | Jowett et al. | 210/33 |
| 4,312,956 A | * | 1/1982 | Chong et al. | 210/686 |
| 4,537,683 A | | 8/1985 | Isacoff et al. | 210/667 |
| 4,632,745 A | * | 12/1986 | Giuffrida et al. | 204/632 |
| 4,670,154 A | * | 6/1987 | Carlson et al. | 210/189 |
| 4,693,832 A | * | 9/1987 | Hurst | 210/754 |
| 4,724,082 A | * | 2/1988 | Boom | 210/679 |
| 5,152,896 A | | 10/1992 | Mazet et al. | 210/638 |
| 5,236,595 A | * | 8/1993 | Wang et al. | 210/669 |

OTHER PUBLICATIONS

Hongve, Dag, "Anion Exchange for Removal of Humus from Drinking Water: Calcium Improves the Efficiency of the Process" *Wat Res* 23:11 (1989) 1451–1454.

Chriswell et al., "Comparsion of Macroreticular Resin and Activated Carbon as Sorbents" *Journal AWWA* (Dec. 1977) 669–674.

Swinton et al., "Continuous Ion Exchange Using Magnetic Microbeads—Field Trials of a Transportable Pilot Plant" *AWWA $10^{th}$ Federal Convention* (1983) 30-1-30-14.

Naumczyk et al., "Organics Isolation from Fresh and Drinking Waters by Macroporous Anion–Exchange Resins" *Wat. Res.* 23:12 (1989) 1593–1597.

Symons et al., "The Use of Anion Exchange Resins for the Removal of Natural Organic Matter from Municipal Water" *International Water Conference, Proceedings Book* (Oct. 1992) 92–120.

Gottlieb, Michael C., "The Use of Anion Exchange Resins for the Removal of Natural Organic Matter from Municipal Water" (details undetermined).

Odegaard et al., "Removal of Humic Substances by Ion Exchange" *Aquatic Humic Resources*, American Chemical Society (1989) 813–834.

Fu et al., "Mechanistic Interactions of Aquatic Organic Substances with Anion–Exchange Resins" *Aquatic Humic Resources*, American Chemical Society (1989) 797–811.

Tilsley, Gareth M., "Ion Exchange in the Water Industry—Interaction of Organic Matter with Anion Resins" *Chemistry and Industry* (Mar. 1978) 142–149.

Kim et al., "Using Anion Exchange Resins to Remove THM Precursors" *Research & Technology Journal AWWA* (Dec. 1991) 61–68.

Brattebo et al., "Ion Exchange for the Removal of Humic Acids in Water Treatment" *Wat. Res.* 21:9 (1987) 1045–1052.

Kunin et al., "Removal of Humic Material from Drinking Water by Anion Exchange Resins" *Activated Carbon Adsorption of Organics from the Aqueous Phase*, Ann Arbor Science, Ann Arbor, vol. 2 (1980) 425–441.

Bursill et al., "The Effect of Natural Organics on Water Treatment" *AWWA $11^{th}$ Federal Convention* (1985) 197–204.

Harries et al., "Anion Exchange in High Flow Rate Mixed Beds" *Effluent and Water Treatment Journal* (Apr. 1984) 131–139.

Thurman et al., "Separation of Humic Substances and Anionic Surfactants from Ground Water by Selective Adsorption" *Aquatic Humic Substances: Influence on Fate and Transformation of Pollutants*, American Chemical Society (1989) 107–114.

van Breemen et al., "The Fate of Fulvic Acids During Water Treatment", *Wat. Res.*, vol. 13 (1979) 771–779.

Rook et al., "Removal of Trihalomethane Precursors from Surface Waters Using Weak Base Resins" *Water Technology/Quality Journal AWWA* (1979) 520–524.

Brown et al., "Anion Exchange Resin Performance in the Treatment of River Trent Water" *Effluent and Water Treatment Journal* (Aug. 1974) 417–422.

Derwent Abstract Accession No. 86–281075/43, JP 61–204080A, Tokuyama Soda KK, Sep. 10, 1986.

Derwent Abstract Accession No. 92–288534/35, JP 04–197435, Sumitomo Chem. Co Ltd, Jul. 17, 1992.

Derwent Abstract Accession No. 91–255202/35, HU T056044 A, Vilamosenergiaipari ki, Jul. 29, 1991.

* cited by examiner

Figure 1

WATER TREATMENT PROCESS

The present invention relates to water treatment, in particular to a process for the removal of dissolved organic carbon from water.

The processes used in water treatment are largely a function of raw water quality. Potable water supplies often contain unacceptably high levels of organic compounds dissolved, dispersed or suspended in raw water. These organic compounds are referred to herein as dissolved organic carbon (DOC). Other terms used to describe DOC include total organic carbon, organic colour, colour and natural organic matter. DOC often includes compounds such as humic and fulvic acids. Humic and fulvic acids are not discrete organic compounds but mixtures of organic compounds formed by the degradation of plant residues.

The removal of DOC from water is necessary in order to provide high quality water suitable for distribution and consumption. A majority of the compounds and materials which constitute DOC are soluble and not readily separable from the water. The DOC present in raw water renders conventional treatment difficult and expensive.

The provision of a safe potable water supply often requires treatment of water to make it aesthetically acceptable. The removal of suspended matter and colour is an important aspect of this treatment. Two approaches are commonly used for the removal of suspended matter and colour. One involves coagulation and the other membrane filtration.

In the process involving coagulation, a coagulant is applied to destabilise suspended matter and colour so that they coalesce and form a floc, which can then be physically removed by methods such as floating, settling, filtration or a combination thereof. Coagulants such as alum (aluminium sulphate), various iron salts and synthetic polymers are commonly used in processes for water treatment. However, many raw water sources have high levels of DOC present, which is the main cause of the colour, and the DOC reacts with the coagulant requiring a higher coagulant dose than would be required for removal of suspended matter alone. The bulk of the floc formed may then be removed by sedimentation or flotation and the water containing the remainder of the floc passed through a filter for final clarification. However, even after such treatment the treated water may contain as much as 30–70% of the initial DOC.

In the membrane filtration process the water is filtered through a membrane system. However, where the water contains high levels of DOC the membranes tend to be fouled by the DOC, thereby reducing the flux across the membrane, reducing the life of the membranes and increasing operating costs. Membrane systems designed to handle water containing high levels of DOC have much higher capital and operating costs than conventional membrane systems used for the production of potable water.

Ion-exchange resins have been used in water treatment processes for the removal of DOC by passing water treated to remove turbidity and other suspended particles through ion-exchange resin packed in columns or the like. Passing untreated water through a packed resin can cause the packed resin to become clogged and ineffective, problems similar to those faced in membrane filtration.

The present invention provides a process for the reduction or elimination of DOC from water using ion-exchange resins which can be conveniently separated from the water prior to subsequent treatment and its distribution and consumption. Accordingly, we provide a process for the removal of dissolved organic carbon from water, which process includes the following steps:

a. adding an ion-exchange resin to water containing dissolved organic carbon;
b. dispersing the resin in the water to enable adsorption of the dissolved organic carbon onto the resin; and
c. separating the resin loaded with the dissolved organic carbon from the water.

The ion-exchange resin is dispersed in the water so as to provide the maximum surface area of resin to adsorb the DOC. Dispersal of the ion-exchange resin may be achieved by any convenient means. Typically the resin may be dispersed by mechanical agitation such as stirrers and the like, mixing pumps immersed in the water or air agitation where a gas is bubbled through the water. Sufficient shear needs to be imparted on the water to achieve dispersal of the resin.

In some small scale operations for the ion exchange resin may be dispersed in a semi-fluidized bed provided pumping costs are not economically unfeasable. The use of a semi-fluidized bed is not only a convenient means for dispersal of the ion exchange resin but provides for the ready separation of the loaded resin from the water once DOC is adsorbed onto the ion exchange resin.

Separating the resin loaded with DOC from the water may be achieved by settling or screening or a combination thereof. Screening of the loaded resin from the water may be achieved by any convenient means. The screens may be selected with consideration for the size of resin particles to be removed from the water. The configuration of the screens may be such that clogging of the screens is reduced.

In a preferred embodiment, the ion-exchange resin may be more dense than the water and tend to settle to the bottom of the tank. This settling facilitates the convenient separation of the loaded resin from the water. Settling may be facilitated by the use of tube settlers and the like. The resin may then be collected by various means including vacuum collection, filtration and the like. It is preferable that the separation and collection means do not cause mechanical wear which may lead to attrition of the resin.

When a continuous fully suspended system is used, the resin may conveniently be separated from treated water by gravity settling. Based on resin characteristics, very effective (>99% solids removal) gravitational settling is achieved in high-rate settling modules with retention times less than 20 minutes.

In a preferred process for separating the ion-exchange resin from the water the bulk of resin particles settle out in the first quarter of the separating basin length which is devoid of settler modules ("free-flowing" settling). Further removal of resin particles ("enhanced" settling) from treated water is performed in the settler compartment filled with modules which may be either, tilted plates or tubular modules. The bottom of the settler is designed for collection of resin particles in cylindrical, conical or pyramidal hoppers from which the resin particles are pumped back to the front of the process. In this preferred process some mixing of the settled resin in the hoppers may be required to keep it in a fluid condition and to ensure uniform resin concentration of resin in the recycle system.

The ion-exchange resins suitable for use in the process of the present invention have cationic functional groups. The cationic functional groups provide suitable sites for the adsorption of the DOC.

It is preferred that the ion-exchange resins have a diameter less than $100\,\mu M$, preferably in the range of from $25\,\mu M$ to $75\,\mu M$. This size range provides an ion-exchange resin which can be readily dispersed in the water and one which is suitable for subsequent separation from the water. The size of the resins affects the kinetics of adsorption of DOC and the effectiveness of separation. The optimal size range for a particular application may be readily determined by simple experimentation.

It is preferred that the ion-exchange resin is macroporous. This provides the resins with a substantially large surface area onto which the DOC can be adsorbed.

Water treatment processes involve the movement of water by stirring, pumping and other operations which can deleteriously effect the ion-exchange resin. It is preferred that the resin is manufactured from tough polymers with polystyrene crosslinkage. The resin may be selected to give the optimum balance between toughness and capacity.

In the process of the present invention the amount of ion-exchange resin necessary to remove DOC from water is dependent on a number of factors including the level of DOC initially present in the water to be treated, the nature of the DOC, the desired level of DOC in the treated water, salinity, temperature, pH, the number of cycles of the resin prior to regeneration and the rate at which it is desired to treat the water to remove DOC. Typically, the amount of ion-exchange resin used to remove DOC from water will be in the range from 0.5 to 5 ml of wet resin per liter of raw water, preferably 0.5 to 3 ml. Higher resin concentrations may also be useful in removing DOC. Such higher concentrations allow shorter contact times and more effective DOC removal.

High doses of resin can be used to remove up to 90% of the dissolved organic carbon but the relationship is non linear and it may not be economical under normal conditions to add resin at these high doses. Sufficient resin may be added to remove a percentage of the dissolved organic carbon such that the cost of any subsequent treatment used to meet water quality objectives is minimised. For example, we have found that removal of dissolved organic carbon reduces the amount of coagulant required to achieve acceptable product water quality. It may also significantly reduce the capital and operating costs of membrane filtration processes.

Preferred ion-exchange resins are recyclable and regenerable. Recyclable resins can be used multiple times without regeneration and continue to be effective in adsorbing DOC. Regenerable resins are capable of treatment to remove adsorbed DOC and such regenerated resins can then be re-introduced into the treatment process.

We have found that, depending on the amount of resin being employed in the treatment process, the resin can be effectively recycled at least 10 times prior to regeneration and in fact at least 20 times depending on water quality. Thus, in a continuous process only 10% or less of the loaded resin, even merely 5%, has to be taken for regeneration, the remainder can be recycled back into the treatment process.

We have found that the used (or spent) resin may be readily treated to remove the adsorbed DOC. Accordingly, we provide a process which incorporates the following additional steps for regenerating spent ion-exchange resin:

a. adding the spent resin to brine;
b. dispersing the spent resin in the brine for the desorption of the DOC from the resin; and
c. separating the regenerated resin from the brine.

It will be understood that the term brine means any high concentration salt solution capable of causing the desorption of DOC from the resin. High concentration sodium chloride solutions are particularly useful as brine in the present process.

The spent resin may be dispersed in the brine by any convenient means. We have found agitation by mechanical stirring or gas bubble agitation to be particularly convenient.

Separation can be achieved by allowing the regenerated resin to settle or by simply filtering through a mesh of appropriate porosity. We have found that the brine can be recycled and used to regenerate resin for a number of times before it becomes unsuitable for use in the regeneration process. The spent brine can itself be regenerated by passage through a reverse osmosis membrane to separate the DOC from the brine. The DOC thus produced is a useful source of humic and fulvic acids.

An alternative process for regenerating spent or loaded ion exchange resin which requires much less brine for the regeneration process may be particularly useful in a number of applications. We have found that the spent ion exchange resin may be packed into a column and the passage of a relatively small quantity of brine through it can effectively regenerate the ion exchange resin. Accordingly, we provide a process for regenerating spent ion exchange resin including the following steps:

a. packing the spent resin into a column; and
b. passing brine through the packed column for the desorption of the DOC from the resin.

The regeneration of the spent ion exchange resin according to this process employing a packed column of spent resin enables particularly high rates of desorption of the DOC from the resin. We have found that by using this process the recyclability of the resin prior to subsequent regenerations is substantially improved.

Further, the humic and fulvic acids are present in significantly higher concentrations in the elutants from the column and thus are a more convenient and economic source of humic and fulvic acids.

The process of the present invention for removal of DOC from water is particularly useful in water treatment applications for the production of potable water. However, the process could also successfully be applied to other aqueous streams where DOC removal is required, eg: industrial use applications, hospital facilities, mining applications or food processing. The process may also be applied to the treatment of waste water. A variety of organic materials, such as toxins or other contaminants, may be removed from waste water.

We have found that a class of ion-exchange resins is particularly suited to use in the process of the present invention. Ion-exchange resins incorporating magnetic particles, known as magnetic ion-exchange resins agglomerate, sometimes referred to as "magnetic flocculation", due to the magnetic attractive forces between them. This property renders them particularly suited for this application as the agglomerated particles are more readily removable from the water. Accordingly, we provide a process for the removal of dissolved organic carbon from water, which process includes the following steps:

a. adding a magnetic ion-exchange resin to water containing dissolved organic carbon;
b. dispersing the resin in the water to enable adsorption of the dissolved organic carbon onto the magnetic ion-exchange resin;
c. agglomerating the magnetic ion-exchange resin loaded with the dissolved organic carbon; and
d. separating the agglomerated magnetic ion-exchange resin loaded with the dissolved organic carbon from the water.

The magnetic ion-exchange resin may be dispersed in the water by any of the means described above. Sufficient shear needs to be imparted on the water to overcome the magnetic forces which cause the magnetic ion-exchange resin to agglomerate.

Agglomeration of magnetic ion-exchange resin loaded with DOC is achieved by removing the shear which causes the resin to disperse. In an unstirred tank, the magnetic particles in the resin cause the resin to agglomerate. The agglomeration may be facilitated by the use of tube settlers and other means known to those skilled in the art.

Typically the wet magnetic ion-exchange resin is more dense than the water and once agglomeration has commenced the resin tends to settle quickly to the bottom of the tank. This settling facilitates the convenient separation of the loaded resin from the water. The resin may then be collected by various means including vacuum collection, filtration, magnetic transport such as belts, pipes, disks and drums, pumps and the like. We have found vacuum collection particularly convenient. It is preferable that the separation and collection means do not cause mechanical wear which may lead to attrition of the resin.

It is preferred that the ion-exchange resins have a diameter less than 100 $\mu$M, preferably in the range of from 25 $\mu$M to 75 $\mu$M. The size of the magnetic ion-exchange resin affects the kinetics of absorption of DOC and the effectiveness of agglomeration and settling. The optimal size range for a particular application may be readily determined by simple experimentation.

The magnetic ion-exchange resin can have a discrete magnetic core or have magnetic particles dispersed throughout the resin. In resins which contain dispersed magnetic particles it is preferred that the magnetic particles are evenly dispersed throughout the resin.

A particularly preferred magnetic ion-exchange resin is described in the copending provisional application number PM8070 now filed as a PCT application designated all states including the United States of America and entitled "Polymer beads and method for preparation thereof" which application is in the names of Commonwealth Scientific and Industrial Research Organisation and ICI Australia Operations Pty Ltd.

The spent magnetic ion-exchange resin may be treated to remove the adsorbed DOC. Accordingly, we provide a process for regenerating spent magnetic ion-exchange resin including the following steps:

a. adding the spent magnetic ion-exchange resin to brine;

b. dispersing the spent magnetic ion-exchange resin in the brine for the desorption of the DOC from the magnetic ion-exchange resin;

c. agglomerating the regenerated magnetic ion-exchange resin; and d. separating the regenerated magnetic ion-exchange resin from the brine.

An alternative process for regenerating spent or loaded magnetic ion-exchange resin which requires much less brine for the regeneration process may be particularly useful in a number of applications. We have found that the spent magnetic ion-exchange resin may be packed into a column and the passage of a small quantity of brine through it can effectively regenerate the magnetic ion exchange resin. Accordingly, we provide a process for regenerating spent magnetic ion exchange resin including the following steps:

a. packing the spent resin into a column; and b. passing brine through the packed column for the desorption of the DOC from the resin.

The regeneration of the spent magnetic ion exchange resin according to this process employing a packed column of spent magnetic resin enables particularly high rates of desorption of the DOC from the magnetic resin. We have found that by using this process the recyclability of the magnetic resin prior to subsequent regenerations is substantially improved.

Further, the humic and fulvic acids are present in significantly higher concentrations in the elutants from the column and thus are a more convenient and economic source of humic and fulvic acids.

The process for the removal of DOC from water is useful in water treatment applications for the production of potable water. The treated water is generally disinfected prior to distribution. The levels of DOC can be as much as 70% of the initial DOC after treatment with conventional processes. This DOC may react with any applied disinfectant to produce by-products. Chlorine is often the preferred disinfectant due its cost, ease of use and the fact that a chlorine residual can be maintained throughout the distribution system to inactivate any contamination that may be introduced after the primary disinfection. Chlorine, however, may react with DOC to form a range of by-products, the most well known being trihalomethanes (THMs). THMs have been identified as possible carcinogens and together with the other possible by-products are identified as a health risk in water treatment guidelines throughout the world. Not only can the DOC form such by-products but the oxidation of the DOC into smaller more biodegradable organics, particularly by the use of ozone as a disinfectant, provides a ready food source for bacteria and may result in the regrowth of bacteria in water storages or distribution systems.

Accordingly, we provide a process for water treatment, which includes the following steps:

a. adding an ion-exchange resin to water containing dissolved organic carbon;

b. dispersing said resin in the water for the adsorption of the dissolved organic carbon onto the resin;

c. separating the resin loaded with the dissolved organic carbon from the water; and d. disinfecting the water.

The steps of adding, dispersing and separating the ion-exchange resin may be accomplished by the methods described above. The water may be disinfected by any convenient means. It is particularly preferred that chlorine or chloramines are used to disinfect the water prior to its storage and/or distribution.

The magnetic ion-exchange resins may preferably be used in this process. Accordingly, we provide a process for water treatment, which includes the following steps:

a. adding a magnetic ion-exchange resin to water containing dissolved organic carbon;

b. dispersing said magnetic ion-exchange resin in the water for the adsorption of the dissolved organic carbon onto the magnetic ion-exchange resin;

c. agglomerating the magnetic ion-exchange resin loaded with the dissolved organic carbon;

d. separating the agglomerated magnetic ion-exchange resin loaded with the dissolved organic carbon from the water; and e. disinfecting the water.

The steps of adding, dispersing, agglomerating and separating the magnetic ion exchange resin may be accomplished by the methods described above.

The process of the present invention is readily incorporated into existing water treatment facilities. For example, it may be used in conjunction with membrane filtration to improve the effectiveness of the membranes, increase the flux across membranes and reduce operating costs. For new installations it may either replace membrane filtration, or if membrane filtration is still required, significantly reduce the size and hence capital and operating costs of a membrane filtration plant. In fact, the reduction in capital and operating costs may enable consideration to be given to the installation of membrane filtration rather than coagulation/sedimentation plants thereby substantially reducing the size of the plant and enabling the production of potable water without the addition of chemicals other than for disinfection purposes.

Accordingly, in a further aspect the invention provides a process for the treatment of water which includes the following steps:

a. adding an ion-exchange resin to water containing dissolved organic carbon;

b. dispersing said resin in the water to enable adsorption of the dissolved organic carbon onto the ion-exchange resin;

c. separating the ion-exchange resin loaded with the dissolved organic carbon from the water; and d. subjecting the water to membrane filtration.

In an alternative process, steps c. & d. above may be combined so that the membrane effects separation of the resin while simultaneously filtering the water.

Many water treatment facilities use a coagulation/sedimentation step in their water purification process. For example, in South Australia a six stage process, which is a typical conventional water treatment process, is used to treat the source water for distribution. The six stages are as follows:

Coagulation/Flocculation;

Sedimentation;

Filtration;

Disinfection;

Storage and Distribution; and

Sludge Dewatering and Disposal.

The process of the present invention may be incorporated into this water treatment process most effectively prior to coagulant addition. Typically, coagulants such as alum (aluminium sulphate), iron salts and synthetic polymers are used. The removal of DOC by the present process results in a substantial reduction in the quantity of coagulant required. In addition the removal of DOC reduces the requirement for subsequent chemical additions and improves the efficiency and/or rate of coagulation, sedimentation and disinfection. This has a beneficial impact on the water quality produced and the size of most facilities required within the water treatment plant including sludge handling facilities. These impacts are particularly convenient in the retrofitting of the process of the present invention as they enable the present process to be conveniently incorporated without substantial change in the overall size of the water treatment plant. Accordingly, in a further aspect the invention provides a process for the removal of dissolved organic carbon from water, which process includes the following steps:

a. adding an ion-exchange resin to water containing dissolved organic carbon;

b. dispersing said resin in the water to enable adsorption of the dissolved organic carbon onto the resin;

c. separating the resin loaded with the dissolved organic carbon from the water; and d. subjecting the water to coagulation/sedimentation.

Utilising the process of the present invention to remove a high proportion of the dissolved organic carbon, reduces the coagulant dose required and may allow the lower volumes of floc produced to be removed from the water directly by filtration, without the need for prior sedimentation.

Some water treatment processes employ activated carbon as a final polishing treatment to alleviate problems with taste and/or odour, to remove disinfection by-products or to remove any other pollutants. The life of the activated carbon is substantially reduced by the presence of DOC in the treated water. Accordingly, a further advantage of our process is that the useful life of activated carbon may be significantly increased. Accordingly, another useful aspect of the present invention includes the further step of subjecting the treated water to activated carbon.

On greenfield sites the use of the process of the present invention will allow significantly smaller footprint water treatment plants to be designed and constructed. The reduction/elimination of DOC from the water using the process of the present invention may be effected in a relatively small volume basin. This is due to the fact reaction and settling rates of the process. This enables the amount of coagulant used in coagulation/sedimentation processes to be reduced which consequently reduces the size of the sedimentation facilities and the size and cost of the water treatment plant. Likewise the size and cost of membrane systems in membrane filtration plants may be reduced which in turn make membrane filtration systems more economically viable when compared with coagulation/sedimentation plants.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The invention will now be further described with reference to the following non-limiting examples. All percentages used herein are by weight unless otherwise stated. The following test methods were used unless otherwise stated.

1. The turbidity was determined (in nephelometric turbidity units) by direct measurement using a nephelometer (Hach Ratio Turbidimeter [Model 18900]).

2. The pH was determined by glass electrodes in combination with a reference potential provided by a silver/silver chloride or saturated calomel electrode.

3. The colour was calculated by comparison of the absorbance of the sample at 456 nm with a calibration curve of Pt—Co standard solutions at the same wavelength. The colour was recorded in Hazen units (HU) whereby 1 HU equals 1 ppm of platinum.

4. The UV Absorbance was determined spectrophotometrically at 254 nm using distilled water as a reference.

5. A Skalar SK12 organic carbon analyser was used to measure DOC levels. The analyser used a peristaltic pump to continually aspirate samples and mix them with reagents.

The sample was filtered through Whatman No. 1 filter paper overlain with 0.45 $\mu$m membrane. The sample was then acidified with sulphuric acid and sparged with nitrogen. This liberated and dispersed any inorganic or volatile organic carbon. The sample solution was then mixed with a persulphate/tetraborate reagent (34 g sodium tetraborate decahydrate and 12 g potassium persulphate dissolved in 1 liter of water) and passed through a UV digestion coil. This process oxidised the organic carbon to $CO_2$. The $CO_2$ was expelled from solution by acidifying and sparging, and then mixed with hydrogen ($H_2$) and passed over a Ni catalyst at 400° C. This reduced the $CO_2$ to methane ($CH_4$) which was measured with a flame ionisation detector.

6. Total Aluminium and Total Iron were determined by inductively coupled plasma spectrometry.

7. Standard Jar Tests:

The raw water and resin treated water were subjected to jar tests which enable the evaluation of various coagulants and coagulant aids used in water treatment by simulating a conventional water treatment process, consisting of coagulation, flocculation, sedimentation and filtration. Equal volumes of water (1500 ml) were entered into jars.

The multiple stirrer operated at the "flash mix" speed, approximately 200 rpm. The test solutions of coagulant were added as quickly as possible and flash mixed for a minute.

The speed of the mixer was reduced to the minimum required to maintain the floc uniformly suspended. Slow mixing was continued for a further 14 minutes. Towards the end of the flocculation time, the floc size was recorded.

After the slow mixing period, the paddles were quickly withdrawn and the settling of the floc particles observed.

After 15 minutes quiescent settling, approximately 60 ml of each solution was withdrawn from the sampling tap (the first 20 ml was discarded) and the settled water turbidity and pH determined on the remaining volume.

The remaining supernatant was then carefully gravity filtered through a Whatman No. 1 filter paper. The first 50 ml of filtrate was discarded. The turbidity, colour and aluminium residuals of the filtered solution was then recorded.

8. Jar Testing Under Direct Filtration Conditions.

Jar testing was performed under the following direct filtration conditions:

room temperature (approx. 20° C.).

alum and water were flash mixed for 1 minute.

the stirring reduced to 25 rpm for 4 minutes (flocculation time) for floc formation.

no settling of floc in contrast to Standard Jar Test.

water clarified by filtration with Whatman No. 1 papers prior to analysis.

9. Method for the Determination of Chlorine Demand

A method for determining the chlorine demand of a water sample, by standard addition of chlorine and direct measurement using DPD/FAS titration.

Reagents:
Chlorine demand free water
Phosphate Buffer Solution (pH 6.5)
N,N-Diethyl-1-4-phenylene diamine sulphate (DPD) Indicator Solution
Standard Ferrous Ammonium Sulphate (FAS) Titrant
Standard Chlorine Solution A chlorine solution (approx. 1000 mg/L) of measured concentration is prepared from stock sodium hypochlorite solution (approx. 10% available chlorine after filtering through 0.45 μm membrane).

Two 100 mL volumetric flasks are filled with sample water and accurately dosed with standard hypochlorite solution to produce doses equivalent to 5, 10, 15 or 20 mg/L. A different dose is employed for each of the flasks, with the two doses adjacent in the series.

The samples are then left to stand in the dark at 20° C. for the required contact time after which the concentration of residual chlorine is measured by the DPD/FAS titration method.

The chlorine demand is calculated as being the difference between the amount of chlorine in the original dose and residual chlorine concentration. The results from the titrations are averaged to obtain the demand.

NOTE: If 50.0 $cm^3$ sample used Residual=2×Titre

Calculation and Expression of Results

From the titration, amount of chlorine is read directly from the titre FAS titrant: 1 mL FAS=100 ug Cl as $Cl_2$

Therefore for 100 mL sample 1.00 mL standard FAS titrant=1.00 mg/L available residual chlorine.

Results are quoted to one decimal place.

Example Resin 1

Magnetic polymer beads were prepared in accordance with the process of the copending application in the name of CSIRO and ICI using the following raw materials:

1. Water: this is the continuous medium in which the organic phase is dispersed and then reacted.
2. Gosenhol® GH 17: this is a high molecular weight polymeric surfactant, a polyvinyl alcohol, that disperses the organic phase in the water as droplets.
3. Teric® N9: this is a low molecular weight surfactant that is added to further reduce the particle size of the dispersed organic phase.
4. Cyclohexanol: this is the major porogen: it is a solvent for the monomers, but a non-solvent for the polymer, and it promotes the formation of voids and internal porosity in the resin beads.
5. Dodecanol: this is the minor porogen.
6. Solsperse® 24000: it is a solid phase dispersing agent and is a block copolymer of poly(hydroxystearic acid) and poly(ethyleneimine).
7. Pferrox® 2228HC γ-$Fe_2O_3$: gamma-iron oxide (maghemite). This is the magnetic oxide that makes the resin beads magnetic.
8. DVB-50 (divinyl benzene): this is the monomer that crosslinks the beads.
9. GMA (glycidyl methacrylate): this is the monomer that is first polymerised to incorporate it into the beads, then it is quaternized to place quaternary ammonium groups into the beads, thereby creating the ion exchange sites:

10. AIBN: that is the catalyst that initiates polymerisation when the mixture is heated above 50° C.
11. Trimethylamine: this is the amine that reacts with the epoxy group of the glycidyl methacrylate to form quaternary ammonium ion exchange sites.
12. Hydrochloric acid: this is used to neutralise the high pH due to the trimethylamine.
13. Ethanol: this is used as a rinse and as a wetting agent.

Method

Water (6.3 L) was charged to a 20 L reactor and the stirrer and nitrogen purge started. Next Gosenhol® GH-17 (30 g) and Teric® N9 (15 g) were added, and the water phase heated to 80° C. to dissolve the surfactants. While the water was heating cyclohexanol (1755 g) was charged to a separate stirred mix tank and the stirrer turned on. Dodecanol (195 g), SOLSPERSE® 24000 (63 g), Pferrox 2228 HC $\gamma$-$Fe_2O_3$ (936 g), divinylbenzene (410 g), and glycidyl methacrylate (1541 g) were added in turn. This mixture was stirred and sonicated for one hour. Azoisobutyronitrile (8 g) was added and the mixture was stirred for a further five minutes before adding it to the heated water phase. The resulting dispersion was held at 80° C. (±5° C.) for two hours, during which time polymerisation occurs and the solid resin beads (4.17 kg) were formed. The nitrogen purge is then stopped and the trimethylamine and the hydrochloric acid are added to aminate the resin. These two materials can either be premixed (with great caution due to the exotherm), or added in such a way as to maintain the pH between 6 and 8. The reaction mixture is then held at 80° C. for three hours. The mixture is then cooled to room temperature, and the beads separated from the excess $\gamma$-$Fe_2O_3$ by repeated cycles of washing, settling and decanting (the beads settle much faster than the free oxide particles). The resin beads are then filtered, redispersed in ethanol, then filtered and washed with additional ethanol, then acetone, and then dried with an air stream.

The maghemite was well dispersed throughout the resin beads produced in this Example.

Example Resin 2

Magnetic polymer beads were prepared in accordance with the process of the copending application in the name of CSIRO and ICI using the following raw materials:
1. Water: this is the continuous medium in which the organic phase is dispersed and then reacted.
2. Gosenhol® GH 20: this is a high molecular weight polymeric surfactant, a polyvinyl alcohol, that disperses the organic phase in the water as droplets.
3. Cyclohexanol: this is the major porogen: it is a solvent for the monomers, but a non-solvent for the polymer, and it promotes the formation of voids and internal porosity in the resin beads.
4. Toluene: this is the minor porogen.
5. Solsperse® 24000: it is a solid phase dispersing agent and is a block copolymer of poly(hydroxystearic acid) and poly(ethyleneimine).
6. Pferrox® 2228HC $\gamma$-$Fe_2O_3$: gamma-iron oxide (maghemite). This is the magnetic oxide that makes the resin beads magnetic.
7. KRATON® D1102: this is a low molecular weight rubber, incorporated into the organic phase to toughen the polymer beads.
8. DVD-50 (divinyl benzene): this is the monomer that crosslinks the beads.
9. GMA (glycidyl methacrylate): this is the monomer that is first polymerised to incorporate it into the beads, then it is quaternized to place quaternary ammonium groups into the beads, thereby creating the ion exchange sites.
10. VASO® 67: this is the catalyst that initiates polymerisation when the mixture is heated above 50° C.
11. Trimethylamine: this is the amine that reacts with the epoxy group of the glycidyl methacrylate to form quaternary ammonium ion exchange sites.
12. Hydrochloric acid: this is used to neutralise the high pH due to the trimethylamine.

Method

Water (2333 g) was charged to a 5 L reactor and the stirrer and nitrogen purge started. Next Gosenhol GH20 (10 g) was added, and the water phase heated to 80° C. to dissolve the surfactants. While the water was heating Toluene (130 g), DVB-50 (130 g) and a first portion of Cyclohexanol (130 g) were charged to a separate mix tank and the stirrer turned on. The Solsperse 24000 (21.84 g) and the Pferrox 2228 HC $\gamma$-$Fe_2O_3$ (325 g) were added in turn, then the mixture was stirred and sonicated for 20 minutes to thoroughly disperse the magnetic oxide. Kraton D1102 was then added and the mixture stirred for a further hour to dissolve the toughening agent. The remaining Cyclohexanol (390 g) and the VAZO 67 (2.65 g) were then added and the mixture was stirred for a further five minutes before adding it to the heated water phase. The resulting dispersion was then stirred and held at 80° C. for two hours. The nitrogen purge was stopped and a mixture of trimethylamine (687 g; 25% w/w) and hydrochloric acid (294 g; 36% w/w) added, then the mixture was then stirred and held at 80° C. for a further three hours. The mixture was then cooled and the resulting polymer beads cleaned as in Example 1. Again, the solid magnetic oxide is well dispersed throughout the beads, and the beads are qualitatively tougher than those of Example 1. Further, the size distribution of the polymer beads was relatively narrow.

EXAMPLE 1

Raw water was obtained from the Myponga Reservoir, South Australia. The raw water was pumped into a stirred vessel and was dosed with resin manufactured according to Example Resin 1 at a rate of 2.6 ml of wet resin per liter of raw water. Resin and water were stirred in a flow through system for an average time of 10 minutes before settling for 10 minutes in a plate settler. The water passed up through the plate settler and the clarified water overflowed for collection. The temperature of the water during this process was in the range of from 14 to 16° C.

In the continuous process resin was recycled maintaining the 2.6 ml of wet resin per liter of raw water dose rate. 90% of the resin was recycled without regeneration. The remaining 10% was sent for regeneration (see Example 2).

The raw water and resin treated water were subjected to Standard Jar Tests.

Analyses including DOC, UV absorption and iron were also undertaken. The results of the jar tests on the resin treated water are set out herein in Table 1 and jar tests on raw-water are set out herein in Table 2.

TABLE 1

| ALUM DOSE mg/L | FLOC SIZE mm | UNFILTERED Turbidity NTU | pH | FILTERED Turbidity NTU | Colour HU | Ultra-violet Absorbance (254 nm) | DOC mg/L | Total Aluminium mg/L | Total Iron mg/L |
|---|---|---|---|---|---|---|---|---|---|
| Resin Treated | 0 | 2.3 | 7.9 | 1.2 | 62 | 0.217 | 4.7 | 0.068 | 0.637 |
| 10 | 0 | 2.9 | 7.6 | 1.1 | 42 | 0.165 | 4.6 | 0.563 | 0.355 |
| 20 | 1–2 | 1.1 | 7.4 | 0.2 | 7 | 0.073 | 3.5 | 0.084 | 0.026 |
| 30 | 1–2 | 0.9 | 7.3 | 0.12 | 4 | 0.064 | 3.3 | 0.052 | 0.016 |
| 40 | 2–3 | 0.9 | 7.2 | 0.13 | 3 | 0.061 | 3.2 | 0.042 | 0.016 |
| 50 | 2–3 | 0.6 | 7 | 0.11 | 3 | 0.061 | 3.1 | 0.035 | 0.015 |
| 60 | 3–4 | 0.6 | 6.9 | 0.11 | 2 | 0.062 | 3.0 | 0.024 | 0.012 |

TABLE 2

| ALUM DOSE mg/L | FLOC SIZE mm | UNFILTERED Turbidity NTU | pH | FILTERED Turbidity NTU | Colour HU | Ultra-violet Absorbance (254 nm) | DOC mg/L | Total Aluminium mg/L | Total Iron mg/L |
|---|---|---|---|---|---|---|---|---|---|
| Raw Water | 0 | 1.4 | 7.9 | 0.9 | 119 | 0.522 | 10.5 | 0.092 | 0.74 |
| 20 | 0 | 2 | 7.4 | 1.6 | 118 | 0.523 | 10.6 | 1.81 | 0.718 |
| 30 | 0 | 4.5 | 7.2 | 3.5 | 120 | 0.505 | 10.4 | 2.36 | 0.645 |
| 40 | 1–2 | 3.6 | 7.1 | 0.8 | 31 | 0.252 | 7.1 | 0.417 | 0.097 |
| 50 | 1–2 | 2.5 | 7 | 0.2 | 13 | 0.219 | 5.7 | 0.083 | 0.019 |
| 60 | 1–2 | 2.8 | 6.9 | 0.22 | 10 | 0.127 | 5.4 | 0.077 | 0.013 |
| 70 | 1–2 | 2.7 | 6.7 | 0.21 | 10 | 0.109 | 4.8 | 0.068 | 0.014 |

EXAMPLE 2

The resin taken for regeneration from the process described in Example 1 was regenerated under laboratory conditions. A sample of 10 ml of loaded resin was added to 400 ml 1M sodium chloride and mixed at flash mix speed (200 rpm) over 30 minutes at room temperature (20° C.).

Figure 1:
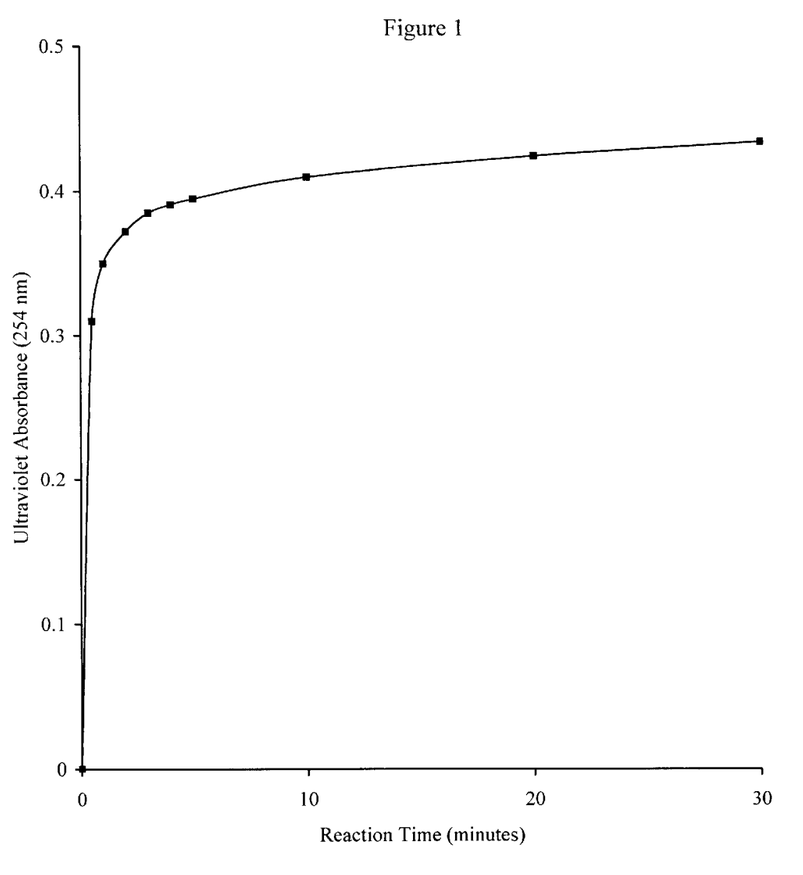
FIG. 1 is a graph of Ultraviolet Absorbance (at 254 nm) versus Reaction Time (in minutes) according to Example 2.

The extent of the resin regeneration was measured by monitoring the increase in the ultraviolet absorbance of the regeneration solution. Ultraviolet absorbance was measured at 254 nm and the results are shown at FIG. 1.

EXAMPLE 3

River Murray water sampled at Mannum, South Australia was treated with varying resin concentrations under the following laboratory conditions:

Water temperature during the run was 21° C.

Resin used was manufactured according to Example Resin 1.

Contacted resin and water by stirring at 100 rpm for 10 minutes.

Resin removed by settling for 10 minutes and passing clarified water through a 30 μm screen prior to Jar Testing. Under Direct Filtration Conditions.

The results of Jar Testing under Direct Filtration Conditions are shown in Table 3.

TABLE 3

| Alum Dose mg/l | Resin Bulk Density ml resin/L water | | | | | |
|---|---|---|---|---|---|---|
| | Colour | | | Turbidity | | |
| | 1 ml | 2 ml | 3 ml | 1 ml | 2 ml | 3 ml |
| 0 | 75 | 31 | 25 | 12 | 11 | 12 |
| 5 | | | | 12 | 12 | 12 |
| 10 | | | 21 | 12 | 12 | 10 |
| 15 | | 23 | 5 | 13 | 10 | 0.88 |
| 20 | 32 | 8 | 3 | 11 | 2.1 | 0.24 |

EXAMPLE 4

Water was sampled from the Millbrook Reservoir, South Australia and was treated with varying resin concentrations under the following laboratory conditions:

Water temperature during the run was 14.5° C.

Resin used was manufactured according to Example Resin 2

Contacted resin and water by stirring at 100 rpm for 10 minutes.

Resin removed by settling for approximately 20 minutes and clarified water decanted.

Jar Testing Under Direct Filtration Conditions was performed. The flocculation time however, was 9 minutes at 40 rpm.

The results of Jar Testing Under Direct Filtration Conditions are shown in Table 4.

TABLE 4

| | Chemical Additives | Unfiltered | | Filtered | | Physical & Chemical Properties | | | | |
|---|---|---|---|---|---|---|---|---|---|---|
| Alum | Resin (mL/L) | Turbidity (NTU) | pH | Turbidity (NTU) | Colour (HU) | UVabs (/cm, 254 nm) | DOC (mg/L) | THMFP (ug/L) | Al (mg/L) | Fe (mg/L) |
| raw | 0 | 29.0 | 6.7 | 21.00 | 74.0 | 0.465 | 10.8 | 182 | 1.530 | 1.160 |
| 10 | " | 28.0 | 6.9 | 23.00 | 70.0 | 0.437 | 10.2 | | 2.140 | 1.180 |
| 20 | " | 31.0 | 6.9 | 27.00 | 66.0 | 0.420 | 10.2 | | 3.010 | 1.280 |
| 30 | " | 36.0 | 6.8 | 28.00 | 45.0 | 0.337 | 8.8 | | 3.300 | 1.140 |
| 40 | " | 41.0 | 7.0 | 11.00 | 20.0 | 0.224 | 7.0 | | 1.420 | 0.386 |
| 50 | " | 41.0 | 6.8 | 1.53 | 11.0 | 0.164 | 5.8 | | 0.274 | 0.047 |
| 60 | " | 45.0 | 6.4 | 0.68 | 8.0 | 0.134 | 4.8 | 107 | 0.147 | 0.018 |
| 70 | " | " | 5.5 | 0.60 | 6.0 | 0.115 | 4.3 | | 0.198 | 0.016 |
| 0 | 1 | 29.0 | 6.7 | 22.00 | 55 | 0.330 | 8.3 | 163 | 1.640 | 1.200 |
| 10 | " | 29.0 | 6.4 | 24.00 | 51 | 0.309 | 7.9 | | 2.210 | 1.180 |
| 20 | " | 32.0 | 6.4 | 26.00 | 44 | 0.278 | 7.4 | | 2.700 | 1.110 |
| 30 | " | 37.0 | 6.8 | 14.00 | 14 | 0.157 | 5.9 | | 1.660 | 0.536 |
| 40 | " | 34.0 | 6.7 | 1.20 | 7 | 0.111 | 5.0 | 40 | 0.207 | 0.046 |
| 50 | " | 37.0 | 6.5 | 0.40 | 6 | 0.094 | 4.4 | | 0.090 | 0.012 |
| 0 | 2 | 28.0 | 7.2 | 21.00 | 42 | 0.234 | 6.4 | 55 | 1.550 | 1.070 |
| 5 | " | 27.0 | 7.4 | 22.00 | 41 | 0.220 | 7.2 | | 1.830 | 1.050 |
| 10 | " | 29.0 | 7.4 | 23.00 | 36 | 0.210 | 6.3 | | 2.180 | 1.080 |
| 20 | " | 33.0 | 7.4 | 22.00 | 14 | 0.120 | 5.5 | | 2.340 | 0.877 |
| 30 | " | 33.0 | 7.3 | 0.94 | 5 | 0.072 | 4.9 | 55 | 0.152 | 0.038 |
| 40 | " | 33.0 | 7.2 | 0.52 | 3 | 0.050 | 4.1 | | 0.094 | 0.012 |
| 0 | 3 | 28.0 | 7.3 | 21.00 | 37 | 0.180 | 5.6 | | 1.570 | 1.070 |
| 5 | " | 27.0 | 6.9 | 21.00 | 34 | 0.167 | 4.7 | | 1.760 | 1.020 |
| 10 | " | 29.0 | 7.5 | 23.00 | 24 | 0.141 | 4.7 | | 2.050 | 1.020 |
| 20 | " | 31.0 | 7.4 | 2.40 | 7 | 0.070 | 3.7 | | 0.384 | 0.147 |
| 30 | " | 29.0 | 7.0 | 0.37 | 3 | 0.054 | 3.2 | | 0.105 | 0.070 |
| 40 | " | 29.0 | 7.0 | 0.25 | 2 | 0.046 | 3.0 | | 0.061 | 0.017 |

EXAMPLE 5

Water sampled at North Pine Dam, Brisbane, Queensland was treated with varying resin concentrations under the following laboratory conditions:

Water temperature during the run was 19° C.

Resin used was manufactured according to in Example Resin 2.

Contacted resin and water by stirring at 100 rpm for 10 minutes.

Resin removed by settling for about 20 minutes and decanting the clarified water prior to Jar Testing under Direct Filtration Conditions.

The Jar Testing under Direct Filtration Conditions was performed. However, the flocculation time was 9 minutes at 40 rpm. The results of the Jar Testing under Direction Filtration Conditions are shown in Table 5.

TABLE 5

| | Chemical Additives | Unfiltered | | Filtered | | Physical & Chemical Properties | | | | |
|---|---|---|---|---|---|---|---|---|---|---|
| Alum | Resin (mL/L) | Turbidity (NTU) | pH | Turbidity (NTU) | Colour (HU) | UVabs (/cm, 254 nm) | DOC (mg/L) | THMFP (ug/L) | Al (mg/L) | Fe (mg/L) |
| raw | 0 | 1.8 | 7.6 | 0.28 | 20 | 0.120 | 4.5 | 182 | <0.005 | 0.053 |
| 5 | " | | 7.5 | 0.28 | 16 | 0.116 | 4.5 | | 0.331 | 0.061 |
| 10 | " | | 7.4 | 0.25 | 15 | 0.107 | 4.3 | | 0.414 | 0.047 |
| 15 | " | | 7.4 | 0.14 | 10 | 0.088 | 3.9 | | 0.192 | 0.038 |
| 20 | " | | 7.6 | 0.08 | 8 | 0.076 | 3.7 | | 0.108 | 0.030 |
| 25 | " | | 7.2 | 0.14 | 8 | 0.070 | 3.5 | | 0.074 | 0.034 |
| 30 | " | | 7.1 | 0.08 | 7 | 0.066 | 3.3 | | 0.063 | 0.037 |
| 40 | " | | 7.0 | 0.06 | 5 | 0.057 | 3.0 | | 0.039 | 0.062 |
| 50 | " | | 6.9 | 0.06 | 7 | 0.054 | 2.8 | 84 | 0.030 | 0.025 |
| 0 | 0.5 | 1.0 | 7.5 | 0.31 | 13 | 0.092 | 3.7 | 118 | 0.009 | 0.030 |
| 5 | " | | 7.4 | 0.29 | 12 | 0.090 | 3.7 | | 0.329 | 0.025 |
| 10 | " | | 7.4 | 0.12 | 8 | 0.074 | 3.3 | | 0.180 | 0.028 |
| 15 | " | | 7.3 | 0.13 | 10 | 0.068 | 3.1 | | 0.122 | 0.029 |
| 20 | " | | 7.2 | 0.09 | 5 | 0.061 | 3.0 | | 0.074 | 0.019 |
| 25 | " | | 7.2 | 0.08 | 6 | 0.052 | 2.8 | | 0.060 | 0.086 |
| 30 | " | | 7.1 | 0.05 | 6 | 0.049 | 2.8 | | 0.047 | 0.046 |
| 0 | 1 | 1.1 | 7.5 | 0.27 | 11 | 0.071 | 3.2 | 105 | <.005 | 0.023 |

TABLE 5-continued

| Chemical Additives | | Unfiltered Turbidity | | Filtered Turbidity | Physical & Chemical Properties | | | | |
|---|---|---|---|---|---|---|---|---|---|
| Alum | Resin (mL/L) | (NTU) | pH | (NTU) | Colour (HU) | UVabs (/cm, 254 nm) | DOC (mg/L) | THMFP (ug/L) | Al (mg/L) | Fe (mg/L) |
| 5 | " | | 7.4 | 0.26 | 11 | 0.067 | 3.2 | | 0.303 | 0.017 |
| 10 | " | | 7.4 | 0.08 | 6 | 0.052 | 2.7 | | 0.142 | 0.012 |
| 15 | " | | 7.3 | 0.10 | 6 | 0.046 | 2.5 | | 0.096 | 0.014 |
| 20 | " | | 7.2 | 0.07 | 5 | 0.043 | 2.5 | | 0.075 | 0.021 |
| 25 | " | | 7.2 | 0.07 | 4 | 0.040 | 2.2 | | 0.057 | 0.018 |
| 30 | " | | 7.1 | 0.06 | 4 | 0.038 | 2.2 | | 0.050 | 0.024 |
| 0 | 2 | 1.0 | 7.4 | 0.32 | 8 | 0.045 | 2.4 | 72 | <.005 | 0.014 |
| 5 | " | | 7.4 | 0.16 | 7 | 0.039 | 2.3 | | 0.202 | 0.022 |
| 10 | " | | 7.3 | 0.06 | 7 | 0.032 | 2.1 | | 0.113 | 0.013 |
| 15 | " | | 7.2 | 0.07 | 4 | 0.029 | 2.0 | | 0.071 | 0.042 |
| 20 | " | | 7.1 | 0.04 | 4 | 0.027 | 2.0 | | 0.052 | 0.017 |
| 25 | " | | 7.1 | 0.05 | 3 | 0.027 | 1.9 | | 0.046 | 0.016 |
| 30 | " | | 7.0 | 0.05 | 4 | 0.026 | 1.7 | | 0.034 | 0.014 |
| 0 | 3 | 0.9 | 7.4 | 0.25 | 7 | 0.030 | 1.8 | 59 | <.005 | 0.018 |
| 5 | " | | 7.3 | 0.07 | 4 | 0.024 | 1.5 | | 0.151 | 0.020 |
| 10 | " | | 7.2 | 0.04 | 3 | 0.020 | 1.4 | | 0.093 | 0.009 |
| 15 | " | | 7.1 | 0.05 | 3 | 0.020 | 1.3 | | 0.062 | 0.011 |
| 20 | " | | 7.0 | 0.04 | 5 | 0.020 | 1.3 | | 0.055 | L.005 |
| 25 | " | | 6.9 | 0.04 | 3 | 0.019 | 1.5 | | 0.038 | 0.008 |
| 30 | " | | 6.8 | 0.04 | 3 | 0.019 | 1.3 | | 0.030 | L.005 |

EXAMPLE 6

Water sampled at Lexton Reservoir, Victoria was treated with varying resin concentrations under the following laboratory conditions:

Water temperature during the run was 19° C.

Resin used was manufactured according to in Example Resin 2.

Contacted resin and water by stirring at 100 rpm for 10 minutes.

Resin removed by settling for about 20 minutes and decanting the clarified water prior to Jar Testing under Direct Filtration Conditions.

The Jar Testing under Direct Filtration Conditions was performed. However, the flocculation time was 9 minutes at 40 rpm. The results of the Jar Testing under Direct Filtration Conditions are shown in Table 6.

TABLE 6

| Chemical Additives | | Unfiltered Turbidity | | Filtered Turbidity | Physical & Chemical Properties | | | | | |
|---|---|---|---|---|---|---|---|---|---|---|
| Alum | Resin (mL/L) | (NTU) | pH | (NTU) | Colour (HU) | UVabs (/cm, 254 nm) | DOC (mg/L) | THMFP (ug/L) | Al (mg/L) | Fe (mg/L) |
| raw | 0 | 20.0 | 8.0 | 9.20 | 159 | 0.593 | 11.4 | 243 | 0.812 | 0.652 |
| 10 | " | | 8.0 | 9.50 | 154 | 0.580 | 11.1 | | 1.390 | 0.661 |
| 20 | " | | 7.9 | 10.40 | 156 | 0.580 | 10.7 | | 2.000 | 0.632 |
| 30 | " | | 7.8 | 10.50 | 162 | 0.582 | 10.5 | | 2.380 | 0.541 |
| 40 | " | | 7.8 | 9.20 | 140 | 0.518 | 9.8 | | 2.300 | 0.427 |
| 45 | " | | 7.7 | 6.10 | 99 | 0.416 | 8.9 | | 1.550 | 0.281 |
| 50 | " | | 7.7 | 2.00 | 50 | 0.314 | 8.1 | | 0.677 | 0.111 |
| 60 | " | | 7.7 | 0.50 | 29 | 0.248 | 7.1 | | 0.257 | 0.033 |
| 0 | 0.5 | 12.7 | 7.6 | 8.60 | 119 | 0.457 | 9.3 | 154 | 0.655 | 0.540 |
| 20 | " | | 7.6 | 9.30 | 140 | 0.446 | 8.8 | | 1.520 | 0.420 |
| 30 | " | | 7.5 | 7.30 | 114 | 0.386 | 8.2 | | 1.390 | 0.275 |
| 40 | " | | 7.5 | 0.86 | 31 | 0.220 | 6.6 | | 0.384 | 0.051 |
| 45 | " | | 7.5 | 0.45 | 24 | 0.195 | 6.1 | | 0.270 | 0.031 |
| 50 | " | | 7.4 | 0.29 | 20 | 0.177 | 5.9 | | 0.202 | 0.027 |
| 0 | 1 | 14.0 | 7.6 | 9.00 | 121 | 0.412 | 8.5 | 143 | 0.674 | 0.548 |
| 20 | " | | 7.6 | 9.00 | 129 | 0.405 | 8.2 | | 1.400 | 0.392 |
| 30 | " | | 7.6 | 6.90 | 98 | 0.335 | 7.3 | | 1.390 | 0.261 |
| 35 | " | | 7.6 | 1.68 | 39 | 0.219 | 6.2 | | 0.488 | 0.077 |
| 40 | " | | 7.7 | 0.61 | 25 | 0.181 | 5.8 | | 0.259 | 0.037 |
| 45 | " | | 7.7 | 0.54 | 21 | 0.164 | 5.6 | | 0.203 | 0.027 |
| 0 | 2 | 13.1 | 7.6 | 6.40 | 87 | 0.301 | 6.6 | 189 | 0.655 | 0.496 |
| 10 | " | | 7.8 | 6.60 | 87 | 0.298 | 6.4 | | 1.230 | 0.491 |
| 20 | " | | 7.7 | 5.80 | 77 | 0.270 | 6.2 | | 1.560 | 0.422 |

TABLE 6-continued

| Chemical Additives | | Unfiltered Turbidity (NTU) | pH | Filtered Turbidity (NTU) | Physical & Chemical Properties | | | | |
|---|---|---|---|---|---|---|---|---|---|
| Alum | Resin (mL/L) | | | | Colour (HU) | UVabs (/cm, 254 nm) | DOC (mg/L) | THMFP (ug/L) | Al (mg/L) | Fe (mg/L) |
| 30 | " | | 7.7 | 0.64 | 19 | 1.137 | 4.6 | | 0.367 | 0.077 |
| 40 | " | | 7.6 | 0.20 | 10.6 | 0.107 | 4.2 | | 0.170 | 0.026 |
| 50 | " | | 7.6 | 0.33 | 10.8 | 0.093 | 3.8 | | 0.109 | 0.017 |
| 0 | 3 | 12.5 | 7.3 | 6.10 | 73 | 0.230 | 5.3 | 77 | 0.744 | 0.589 |
| 10 | " | | 7.6 | 6.40 | 70 | 0.224 | 5.0 | | 1.290 | 0.522 |
| 20 | " | | 7.6 | 1.74 | 25 | 0.125 | 4.3 | | 0.651 | 0.158 |
| 30 | " | | 7.6 | 0.25 | 9 | 0.079 | 3.9 | | 0.193 | 0.043 |
| 40 | " | | 7.4 | 0.19 | 7 | 0.068 | 3.7 | | 0.127 | 0.029 |
| 50 | " | | 7.4 | 0.14 | 6 | 0.061 | 3.4 | | 0.112 | 0.022 |
| 0 | 4 | 11.1 | 7.5 | 6.30 | 66.00 | 0.188 | 4.4 | 55 | 0.708 | 0.546 |

EXAMPLE 7

Water sample at of Wanneroo Ground Water, Western Australia was treated with varying resin concentrations under the following laboratory conditions:

Water temperature during the run was 19° C.

Resin used was manufactured according to in Example Resin 2.

Contacted resin and water by stirring at 100 rpm for 10 minutes.

Resin removed by settling for about 20 minutes and decanting the clarified water prior to Jar Testing under Direct Filtration Conditions.

The Jar Testing under Direct Filtration Conditions was performed. However, the flocculation time was 9 minutes at 40 rpm. The results of the Jar Testing under Direct Filtration Conditions are shown in Table 7.

TABLE 7

| Chemical Additives | | Unfiltered Turbidity (NTU) | pH | Filtered Turbidity (NTU) | Physical & Chemical Properties | | | | | |
|---|---|---|---|---|---|---|---|---|---|---|
| Alum | Resin (mL/L) | | | | Colour (HU) | UVabs (/cm, 254 nm) | DOC (mg/L) | THMFP (ug/L) | Al (mg/L) | Fe (mg/L) |
| raw | 0 | 33.0 | 7.5 | 10.70 | 184 | 0.481 | 7.0 | 395 | 0.288 | 1.145 |
| 10 | " | | 7.5 | 11.30 | 190 | 0.468 | 7.0 | | 0.867 | 1.210 |
| 20 | " | | 7.3 | 10.40 | 202 | 0.463 | 6.8 | | 0.564 | 1.210 |
| 30 | " | | 7.3 | 9.00 | 156 | 0.379 | 6.0 | | 1.69 | 0.831 |
| 40 | " | | 7.2 | 2.10 | 41 | 0.150 | 3.8 | | 0.185 | 0.167 |
| 50 | " | | 7.1 | 1.60 | 27 | 0.116 | 3.4 | | 0.122 | 0.116 |
| 60 | " | | 7.1 | 1.54 | 26 | 0.103 | 2.9 | | 0.133 | 0.105 |
| 70 | " | | 7.0 | 0.98 | 18 | 0.082 | 2.7 | 130 | 0.117 | 0.077 |
| 0 | 0.5 | 31.0 | 7.5 | 10.00 | 182 | 0.408 | 6.0 | 373 | 0.322 | 1.215 |
| 10 | " | | 7.5 | 9.80 | 175 | 0.398 | 6.3 | | 0.917 | 1.180 |
| 20 | " | | 7.4 | 9.60 | 172 | 0.396 | 5.2 | | 1.480 | 0.183 |
| 30 | " | | 7.3 | 2.10 | 40 | 0.147 | 3.6 | | 0.199 | 0.154 |
| 40 | " | | 7.3 | 1.80 | 31 | 0.110 | 3.0 | | 0.110 | 0.121 |
| 50 | " | | 7.2 | 1.70 | 28 | 0.095 | 2.6 | 144 | 0.124 | 0.121 |
| 0 | 1 | 28.0 | 7.1 | 11.30 | 183 | 0.352 | 4.9 | 294 | 0.282 | 1.185 |
| 10 | " | | 7.0 | 8.90 | 159 | 0.337 | 4.9 | | 0.882 | 1.080 |
| 20 | " | | 7.0 | 9.00 | 154 | 0.286 | 3.7 | | 0.341 | 0.917 |
| 30 | " | | 6.8 | 0.68 | 17 | 0.088 | 2.7 | | 0.117 | 0.059 |
| 40 | " | | 6.8 | 0.68 | 15 | 0.072 | 2.4 | | 0.086 | 0.052 |
| 50 | " | | 6.8 | 1.21 | 19 | 0.070 | 2.2 | 114 | 0.100 | 0.084 |
| 0 | 2 | 26.0 | 7.5 | 12.00 | 177 | 0.296 | 3.7 | 272 | 0.316 | 1.160 |
| 10 | " | | 7.5 | 9.60 | 157 | 0.281 | 3.6 | | 0.814 | 0.964 |
| 20 | " | | 7.4 | 0.80 | 18 | 0.081 | 2.2 | | 0.180 | 0.116 |
| 30 | " | | 7.3 | 0.76 | 13 | 0.057 | 1.8 | 98 | 0.086 | 0.050 |
| 40 | " | | 7.2 | 0.46 | 10 | 0.046 | 1.6 | | 0.065 | 0.037 |
| 50 | " | | 7.0 | 0.33 | 6 | 0.039 | 1.6 | | 0.045 | 0.020 |
| 0 | 3 | 25.0 | 7.2 | 11.50 | 161 | 0.245 | 3.0 | 183 | 0.274 | 1.070 |
| 10 | " | | 7.3 | 9.40 | 148 | 0.232 | 2.7 | | 0.407 | 0.973 |
| 20 | " | | 7.4 | 0.33 | 9 | 0.048 | 1.7 | 87 | 0.109 | 0.044 |
| 30 | " | | 7.4 | 0.22 | 6 | 0.035 | 1.5 | | 0.060 | 0.024 |
| 40 | " | | 7.3 | 0.30 | 6 | 0.030 | 1.5 | | 0.043 | 0.023 |
| 0 | 4 | 27.0 | 7.7 | 11.80 | 157 | 0.210 | 2.4 | 169 | 0.263 | 0.950 |
| 5 | " | | 7.7 | 10.80 | 148 | 0.204 | 2.4 | | 0.581 | 0.919 |

TABLE 7-continued

| Chemical Additives | | Unfiltered Turbidity (NTU) | pH | Filtered Turbidity (NTU) | Physical & Chemical Properties | | | | | |
|---|---|---|---|---|---|---|---|---|---|---|
| Alum | Resin (mL/L) | | | | Colour (HU) | UVabs (/cm, 254 nm) | DOC (mg/L) | THMFP (ug/L) | Al (mg/L) | Fe (mg/L) |
| 10 | " | | 7.6 | 9.10 | 128 | 0.193 | 2.0 | | 0.646 | 0.584 |
| 15 | " | | 7.6 | 0.28 | 7 | 0.043 | 1.4 | 73 | 0.119 | 0.039 |
| 20 | " | | 7.5 | 0.28 | 6 | 0.033 | 1.3 | | 0.081 | 0.031 |
| 30 | " | | 7.4 | 0.24 | 4 | 0.025 | 1.1 | | 0.047 | 0.015 |
| 0 | 5 | 26.0 | 7.6 | 12.20 | 157 | 0.184 | 1.8 | 152 | 0.268 | 0.925 |
| 5 | " | | 7.6 | 10.30 | 136 | 0.172 | 1.8 | | 0.567 | 0.835 |
| 10 | " | | 7.6 | 3.60 | 51 | 0.081 | 1.3 | | 0.261 | 0.278 |
| 15 | " | | 7.5 | 0.21 | 5 | 0.027 | 1.1 | 51 | 0.104 | 0.029 |
| 20 | " | | 7.4 | 0.20 | 3 | 0.023 | 1.0 | | 0.069 | 0.020 |
| 30 | " | | 7.4 | 0.32 | 3 | 0.019 | 1.0 | | 0.040 | 0.023 |

EXAMPLE 8

Water sampled at Happy Valley Reservoir, South Australia was treated with varying resin concentrations under the following laboratory conditions:

Water temperature during the run was 18° C.

Resin used was manufactured according to Example Resin 7.

Contacted resin and water by stirring at 100 rpm for 10 minutes.

Resin removed by settling for approximately 20 minutes and decanting clarified water prior to Standard Jar Testing.

The Standard Jar Testing was performed except that the coagulant used was ferric chloride at varying dosages. The results of the Standard Jar Testing are shown in Table 8.

TABLE 8

| Ferric Chloride Dose mg/L | Floc Size mm | Unfiltered Turbidity NTU | pH | Filtered Turbidity NTU | Colour HU | Ultraviolet Absorbance (254 nm) | THMFP ug/L | DOC mg/L | Total Aluminium mg/L | Total Iron mg/L |
|---|---|---|---|---|---|---|---|---|---|---|
| Raw Water | | | | | | | | | | |
| 0 | | 5.7 | 7.2 | 3.70 | 57 | 0.289 | 159 | 7.2 | 0.328 | 0.298 |
| 5 | <1 | 5.9 | 7.0 | 3.80 | 74 | 0.370 | 159 | 7.6 | 0.302 | 1.590 |
| 10 | 1 | 6.3 | 6.8 | 4.10 | 88 | 0.429 | 274 | 6.8 | 0.303 | 2.790 |
| 15 | 1 | 7.4 | 6.7 | 4.90 | 77 | 0.390 | 132 | 7.2 | 0.283 | 3.930 |
| 20 | 1 | 9.1 | 6.5 | 4.40 | 36 | 0.222 | 141 | 6.0 | 0.185 | 3.360 |
| 25 | 1 | 10.7 | 6.4 | 0.78 | 14 | 0.134 | 87 | 5.4 | 0.087 | 0.572 |
| 30 | 2 to 3 | 9.0 | 6.2 | 0.48 | 10 | 0.108 | 58 | 4.9 | 0.027 | 0.267 |
| 35 | 3 to 4 | 3.8 | 6.0 | 0.35 | 6 | 0.084 | 47 | 4.8 | 0.044 | 0.211 |
| 40 | 3 to 4 | 2.5 | 6.2 | 0.23 | 4 | 0.076 | 57 | 4.5 | 0.02 | 0.139 |
| 45 | 3 to 4 | 1.7 | 6.3 | 0.22 | 3 | 0.066 | 21 | 4.6 | 0.034 | 0.133 |
| Resin Treated Water (1 mL/L) | | | | | | | | | | |
| 0 | | 2.70 | 6.9 | 2.20 | 35 | 0.182 | 211 | 4.8 | 0.264 | 0.282 |
| 5 | | 3.20 | 7.5 | 2.40 | 52 | 0.261 | 237 | 4.7 | 0.275 | 1.65 |
| 10 | | 4.20 | 7.4 | 3.30 | 14 | 0.119 | 195 | 4.6 | 0.243 | 2.65 |
| 15 | <1 | 5.70 | 7.3 | 0.76 | 7 | 0.089 | 128 | 3.9 | 0.107 | 0.570 |
| 20 | 1 to 2 | 2.50 | 7.2 | 0.41 | 5 | 0.078 | 118 | 3.5 | 0.037 | 0.235 |
| 25 | 2 to 3 | 1.54 | 7.2 | 0.32 | 4 | 0.068 | 124 | 3.3 | 0.033 | 0.156 |
| 30 | 2 to 3 | 0.65 | 7.2 | 0.23 | 2 | 0.054 | 77 | 3.0 | NA | 0.116 |
| Resin Treated Water (3 mL/L) | | | | | | | | | | |
| 0 | | 6.60 | 7.3 | 3.30 | 13 | 0.069 | 52 | 3.8 | 0.284 | 0.238 |
| 5 | 2 | 4.90 | 7.7 | 0.25 | <1 | 0.040 | 55 | 3.1 | 0.079 | 0.077 |
| 10 | 3 to 4 | 1.00 | 7.6 | 0.11 | <1 | 0.033 | 14 | 2.5 | 0.031 | 0.023 |
| 15 | 3 to 4 | 0.60 | 7.5 | 0.10 | <1 | 0.032 | 16 | 1.8 | 0.022 | 0.027 |
| 20 | 3 to 4 | 0.38 | 7.3 | 0.09 | <1 | 0.031 | 12 | 1.9 | 0.018 | 0.032 |
| 25 | 3 to 4 | 0.34 | 7.2 | 0.09 | <1 | 0.030 | 24 | 1.9 | 0.018 | 0.044 |
| 30 | 3 to 4 | 0.32 | 7.0 | 0.10 | <1 | 0.028 | 9 | 1.9 | 0.019 | 0.054 |

EXAMPLE 9

Water sampled at Myponga Reservoir, South Australia was treated with resin and the loaded resin contained approximately 6 milligrams DOC per ml of wet resin. The loaded resin was then subjected to a number of regeneration methods employing brine solutions having varying concentrations of sodium chloride. The resin used was manufactured according to in Example Resin 1.

In the first method the loaded resin (50 ml) was dispersed in a sodium chloride solution at varying molar concentrations (100 ml). In the second method a 200 ml column was packed with loaded resin (50 ml) and the sodium chloride solutions (100 ml) were placed on top of the packed resin and the resin and sodium chloride solution were mixed thoroughly by sparing nitrogen through the column. In the third method a 200 ml column was packed with loaded resin (50 ml) and the sodium chloride solutions (100 ml) were placed on top of the packed resin. The sodium chloride solutions were allowed to pass through the packed resin.

The resultant sodium chloride solutions were measured for UV absorbance and DOC. The results are shown in Table 9 and 10 and the higher organic content of the regenerant solution demonstrates the particular effectiveness of employing a packed column to regenerate the resin.

Optimising Regeneration With Columns

TABLE 9

| | Ultraviolet Absorbance | |
|---|---|---|
| Regeneration Method | Sodium Chloride 1.0 Molar | Sodium Chloride 1.5 Molar |
| Stirred 24 hours | 15.40 | 19.80 |
| Column (mixed by aeration) | 15.60 | 23.80 |
| Column (no mixing) | 24.10 | 29.80 |

TABLE 10

| Method* | UV Absorbance | DOC mg |
|---|---|---|
| Column (mixed by aeration) | 21.4 | 50 |
| Column (no mixing) | 29.9 | 65 |

*Employed 1.5 Molar Sodium Chloride

EXAMPLE 10

Water sampled from the Myponga Reservoir, South Australia was treated with varying resin concentrations under the following laboratory conditions:

Water temperature during run was about 20° C.

Resin used was manufactured according to Example Resin 1.

Contacted resin and water by stirring at 100 rpm for 10 minutes.

Resin removed by settling for approximately 20 minutes and decanting clarified water. The clarified water was measured for UV absorbance and DOC. Chlorine demand tests and THMFP tests were subsequently conducted on the clarified water. The results are shown in Table 11.

EXAMPLE 11

River Murray water sampled at Mamnun, South Australia was treated with varying resin concentrations under the following laboratory conditions:

Water temperature during run was about 20° C.

Resin used was manufactured according to in Example Resin 1.

Contacted resin and water by stirring at 100 rpm for 10 minutes.

Resin removed by settling for approximately 20 minutes and decanting clarified water. The clarified water was measured for UV absorbance and DOC. Chlorine demand test and THMFP tests were subsequently conducted on the clarified water. The results are shown in Table 12.

TABLE 11

| Resin Dose mL/L | Ultraviolet Absorbance 254 nm | DOC mg/L | Chlorine Demand mg/L | THMFP ug/L |
|---|---|---|---|---|
| 0 | 0.320 | 8.1 | 4.1 | 397 |
| 1 | 0.181 | 5.1 | 2.6 | 207 |
| 2 | 0.125 | 3.9 | 1.7 | 156 |
| 3 | 0.084 | 3.0 | 1.0 | 117 |

TABLE 12

| Resin Dose mL/L | Ultraviolet Absorbance 254 nm | DOC mg/L | Chlorine Demand mg/L | THMFP ug/L |
|---|---|---|---|---|
| 0 | 0.103 | 4.4 | 3.0 | 212 |
| 1 | 0.057 | 3.1 | 2.0 | 135 |
| 2 | 0.041 | 2.7 | 1.5 | 102 |
| 3 | 0.028 | 2.3 | 1.5 | 80 |

EXAMPLE 12

Treated effluent from the Handorf Sewage Treatment Works was treated with varying resin concentrations under the following laboratory conditions:

Water temperature during run was approximately 20° C.

Resin used was manufactured according to Example Resin 2.

Contacted resin and water by stirring at 100 rpm for 10 minutes.

Resin removed by settling for approximately 20 minutes and decanting clarified water.

The clarified water was then measured for UV absorbance and DOC. The results are shown in Table 13.

TABLE 13

| Resin Dose mL/L | Ultraviolet Absorbance 254 nm | DOC mg/L |
|---|---|---|
| 0 | 0.164 | |
| 1 | 0.131 | |
| 2 | 0.109 | |
| 3 | 0.092 | |

EXAMPLE 13

Water sampled at Happy Valley, South Australia was subjected to membrane filtration in combination with resin treatment.

The membrane filtration unit was operated at 100 kpa at a flow rate of 5 liters per hour. The temperature of the water was about 20° C.

The effectiveness of the membrane filtration was measured on raw water and on water treated with resin under the following laboratory conditions:

Water temperature during run was about 20° C.
Resin used was manufactured according to Example 4.
Contacted 4 mL/L of wet resin and water by stirring at 100 rpm for 10 minutes.
Resin removed by settling for about 20 minutes and decanting clarified water.

The results of measurements of pH, turbidity, colour, UV absorption and DOC are shown in Table 14. It can be seen that the combination of resin treatment prior to membrane filtration results in acceptable water quality without the need for additional chemicals such as coagulating agents and the like.

TABLE 14

| Analysis | Raw Water | | Resin Treated | |
| --- | --- | --- | --- | --- |
| | Before Membrane | After Membrane | Before Membrane | After Membrane |
| pH | 7.8 | 8.2 | 7.8 | 8 |
| Turbidity (NTU) | 5.20 | 0.37 | 5.20 | 0.32 |
| Colour (HU) | 60 | 32 | 12 | 5 |
| UV abs | 0.276 | 0.197 | 0.067 | 0.048 |
| DOC (mg/L) | | | | |

EXAMPLE 14

Some waters are prechlorinated prior to the water treatment process. Water sampled at Myponga Reservoir, South Australia was prechlorinated with varying doses of chlorine under the following laboratory conditions:

Water treatment during the run was about 20° C.
The prechlorination occurred over 16 hours in the dark.
The prechlorinated water was treated with 1 milliliter of water resin per 2 liters of prechlorinated water under the following laboratory conditions:
Water temperature during the run was about 20° C.
Resin used was manufactured according to Example Resin 1.
Contacted resin and water by stirring at 100 rpm for 30 minutes.
Resin removed by settling for about 20 minutes and decanting clarified water.

The clarified water was measured for colour, UV absorption and DOC and the results are shown in Table 15. These results show that the process is also effective for removing chlorinated DOC from solution.

TABLE 15

| Prechlorination Dose mg/L | Colour HU | UVabs | DOC mg/L |
| --- | --- | --- | --- |
| 0 mg/L | 49 | 0.321 | 7.7 |
| 3 mg/L | 39 | 0.274 | 8.0 |
| 6 mg/L | 32 | 0.246 | 8.0 |
| 9 mg/L | 29 | 0.229 | 7.8 |
| 0 mg/L + resin | 27 | 0.158 | 4.8 |
| 3 mg/L + resin | 18 | 0.136 | 5.0 |
| 6 mg/L + resin | 13 | 0.119 | 4.9 |
| 9 mg/L + resin | 17 | 0.115 | 4.8 |

It will be appreciated that the invention described herein is susceptible to variations and modifications other than those specifically described. It is to be understood that the invention encompasses all such variations and modifications that fall within the spirit and scope. For example, the present process may be employed for the removal of contaminants other than DOC from water. It may be necessary to select an ion-exchange resin with anionic functional groups.

What is claimed is:

1. A process for production of potable water suitable for distribution and consumption from a raw water source containing humic and fulvic acids, said process comprising:
   a) adding a macroporous magnetic ion-exchange resin having cationic functional groups to water containing humic and fulvic acids while imparting sufficient shear on the water to disperse said resin in the water, thereby facilitating adsorption of the humic and fulvic acids onto said resin;
   b) transferring dispersion from step a) to a settling region, thereby causing resin in the transferred dispersion to agglomerate and settle;
   c) separating agglomerated resin containing humic and fulvic acids adsorbed thereon from the water;
   d) disinfecting water from which humic and fulvic acids are removed;
   e) regenerating a portion of said agglomerated resin using brine, with the remainder being returned back to step a), thereby allowing continuous production of potable water;
   f) returning regenerated agglomerated resin to step a).

2. The process according to claim 1, wherein said magnetic ion-exchange resin has magnetic particles evenly dispersed throughout.

3. The process according to claim 1, wherein said magnetic ion-exchange resin has a density greater than water.

4. The process according to claim 1, wherein said shear is imparted by mechanical agitation, mixing pumps immersed in the water, or air agitation.

5. The process according to claim 1, wherein said separating the agglomerated resin is conducted by settling, screening, or a combination thereof.

6. The process according to claim 5, wherein said separated resin is collected by vacuum collection.

7. The process according to claim 5, wherein said settling is facilitated by tilted plates or tubular modules.

8. The process according to claim 1, wherein said resin comprises particles having a diameter less than 100 $\mu$m.

9. The process according to claim 1, wherein said resin comprises particles having a diameter in the range of from 25 $\mu$m to 75 $\mu$m.

10. The process according to claim 1, wherein said resin comprises cross-linked polystyrene based polymers.

11. The process according to claim 1, conducted in conjunction with subjecting the water to membrane filtration.

12. The process according to claim 1, further comprising subjecting the water to coagulation and/or sedimentation.

13. The process according to claim 1, further comprising treating the water remaining after separation of agglomerated resin with activated carbon.

14. The process according to claim 1, wherein said regenerating a portion of said agglomerated resin using brine is conducted by a process comprising:
   a) packing said agglomerated resin into a column,
   b) passing brine through the packed column.

15. The process according to claim 1, wherein said regenerating a portion of said agglomerated resin using brine is conducted by a process comprising:
   a) adding said agglomerated resin to brine,
   b) dispersing said agglomerated resin,
   c) separating said agglomerated resin from the brine.

16. The process according to claim 1, wherein the portion of resin regenerated is upto 10% by weight of the agglomerated resin.

17. The process according to claim 1, wherein the portion of resin regenerated is 5% by weight of the agglomerated resin.

18. A process for the removal of humic and fulvic acids from a raw water source, said process comprising:
   a) adding a macroporous magnetic ion-exchange resin having cationic functional groups to water containing humic and fulvic acids while imparting sufficient shear on the water to disperse said resin in the water, thereby facilitating adsorption of the humic and fulvic acids onto said resin;
   b) transferring dispersion to a settling region, thereby causing said resin to agglomerate and settle;
   c) separating the agglomerated resin containing humic and fulvic acids adsorbed thereon from the water;
   d) regenerating a portion of said agglomerated resin using brine;
   e) returning non-regenerated agglomerated resin to water containing humic and fulvic acids;
   f) returning regenerated agglomerated resin to water containing humic and fulvic acids.

* * * * *